US009759352B2

(12) United States Patent
Lin

(10) Patent No.: US 9,759,352 B2
(45) Date of Patent: Sep. 12, 2017

(54) PRE-EMBEDDED/PRE-BUILT-IN-HOLE CREATING APPARATUS AND PIPE BANK BOX HAVING THE SAME

(71) Applicant: Kuan-Lung Lin, New Taipei (TW)

(72) Inventor: Kuan-Lung Lin, New Taipei (TW)

( * ) Notice: Subject to any disclaimer, the term of this patent is extended or adjusted under 35 U.S.C. 154(b) by 0 days.

(21) Appl. No.: 14/860,350

(22) Filed: Sep. 21, 2015

(65) Prior Publication Data

US 2016/0341341 A1 Nov. 24, 2016

(30) Foreign Application Priority Data

May 18, 2015 (TW) .............................. 104115728 A

(51) Int. Cl.
*F16L 5/04* (2006.01)
*F16L 5/10* (2006.01)
*F16L 5/14* (2006.01)

(52) U.S. Cl.
CPC .................. *F16L 5/04* (2013.01); *F16L 5/10* (2013.01); *F16L 5/14* (2013.01)

(58) Field of Classification Search
CPC ................ F16L 5/04; F16L 5/10; E04B 1/947
USPC ........................................................ 52/220.8
See application file for complete search history.

(56) References Cited

U.S. PATENT DOCUMENTS

| 5,347,767 | A | * | 9/1994 | Roth | ....................... | A62C 2/065 |
| | | | | | | 52/1 |
| 5,452,551 | A | * | 9/1995 | Charland | .................. | F16L 5/04 |
| | | | | | | 52/1 |
| 6,305,133 | B1 | * | 10/2001 | Cornwall | .................. | F16L 5/04 |
| | | | | | | 52/1 |
| 7,810,847 | B1 | * | 10/2010 | Cornwall | .................. | F16L 5/04 |
| | | | | | | 285/136.1 |
| 8,857,528 | B2 | * | 10/2014 | Lee | .......................... | A62C 2/06 |
| | | | | | | 169/48 |
| 2005/0109523 | A1 | * | 5/2005 | Snyder | ..................... | H02G 3/22 |
| | | | | | | 174/483 |

(Continued)

FOREIGN PATENT DOCUMENTS

CN 204300520 U 4/2015
JP 628462 U 4/1994

(Continued)

*Primary Examiner* — Paola Agudelo
(74) *Attorney, Agent, or Firm* — Haverstock & Owens LLP

(57) ABSTRACT

The present invention provides a pre-embedded/pre-built-in hole creating apparatus for buildings, including: a pipe casing for a pipe or a pipeline system of the building to pass there through; at least one thermal-expandable foam detachably accommodated within the pipe casing; an inspection annulus detachably joined with the pipe casing; and a slide cover installed onto the pipe casing and secured to the building structure. The at least one thermal-expandable foam in the hole creating apparatus embedded in the building structure can be removed via the detachable structure for inspection and replacement so as to maintain the flame-retardant function of the hole creating apparatus. Said apparatus further includes an annular shielding plate providing functions of airtight and smoke blocking for the through pipes as well as includes an identifying device providing information, tracking and service associated with the apparatus in order to guarantee long term safety.

2 Claims, 11 Drawing Sheets

(56) References Cited

U.S. PATENT DOCUMENTS

| | | | | |
|---|---|---|---|---|
| 2008/0128998 | A1* | 6/2008 | Klein | F16L 5/04 |
| | | | | 277/604 |
| 2009/0320396 | A1* | 12/2009 | Knudsen | E04H 12/2269 |
| | | | | 52/297 |
| 2010/0059941 | A1* | 3/2010 | Beele | F16L 5/10 |
| | | | | 277/606 |
| 2011/0088342 | A1* | 4/2011 | Stahl, Sr. | H02G 3/0418 |
| | | | | 52/220.8 |
| 2012/0012347 | A1* | 1/2012 | Zernach | A62C 2/065 |
| | | | | 169/48 |
| 2012/0233943 | A1* | 9/2012 | Monden | F16L 5/04 |
| | | | | 52/220.1 |
| 2013/0285329 | A1* | 10/2013 | Sykes | F16L 5/10 |
| | | | | 277/314 |
| 2014/0260016 | A1* | 9/2014 | Langille | F16L 5/04 |
| | | | | 52/232 |
| 2016/0020592 | A1* | 1/2016 | Beele | H02G 3/22 |
| | | | | 248/56 |
| 2016/0180988 | A1* | 6/2016 | Klein | B64C 1/00 |
| | | | | 174/153 G |

FOREIGN PATENT DOCUMENTS

| | | | |
|---|---|---|---|
| JP | 2006318150 | A | 11/2006 |
| JP | 2008106936 | A | 5/2008 |
| JP | 2009257572 | A | 11/2009 |
| JP | 2012149444 | A | 8/2012 |
| TW | M450591 | U1 | 4/2013 |

* cited by examiner

PRE-EMBEDDED/PRE-BUILT-IN-HOLE CREATING APPARATUS AND PIPE BANK BOX HAVING THE SAME

BACKGROUND

Technical Field

The present invention relates to a pre-embedded/pre-built-in hole creating apparatus for buildings, and more particularly, to a pre-embedded/pre-built-in hole creating apparatus with a flame retardant function for long term building safety.

Description of Related Art

The construction of a building generally includes floor and wall construction. The floor is constructed on a moldboard base or a steel supporting panel (the so-called deck board) base, and the thickness and structure of the wall depends on, e.g. thickness of a moldboard or a light partition. In consideration of the interior piping arrangement of a building, the locations where the pipes are to be arranged at either the floor or the wall should be pre-determined so that the directions of the pipes will not be restricted by the floor or wall. Generally, the method for pre-embedding a pipe sleeve is adopted to create a reserved pipe hole. Specifically, a pipe sleeve penetrates a moldboard or a deck board and is secured thereto before concrete has been poured to the base so as to form a reserved pipe hole, thereby allowing a pipe to pass there through in the subsequent piping arrangement configuration and implementation.

In further consideration of fire safety for a building, as flames and smoke can spread from one room to another via pipeline or through their interspaces, the pre-embedded pipe sleeve has been equipped with many additional functions. For example, a pipe sleeve may be combined with a thermal-expandable material to form a flame-retardant pipe sleeve. Specifically, a thermal-expandable (fire-cutting) material is arranged inside a pre-embedded pipe sleeve so that when sufficiently high temperature flames or gases spread to the pre-embedded pipe sleeve along the pipeline in the event of a fire, the thermal-expandable material will react and expand drastically to fully occupy the space in the pipe sleeve, thereby preventing flames and smoke from spreading even further.

In order to equip the flame-retardant pipe sleeve with different functions, pipe sleeves of a variety of designs and types have been developed. TW Utility Model No. M443260 discloses a flame-retardant device. Referring to FIG. 1, the device mainly includes a pipe casing 10, a thermal-expandable foam 11 and a securing member 12. The thermal-expandable foam 11 and the securing member 12 are joined to form an annular body installed onto the pipe casing 10 and securing the pipe casing 10 via the adjustment mechanism of the securing member 12. One end of the pipe casing 10 has an annular projecting rim 101 configured to lay snugly upon the base (e.g. a moldboard) to allow the pipe casing 10 to be vertically placed. After being embedded, the pipe casing 10 becomes a reserved pipe hole while the thermal-expandable foam 11 and the securing member 12 are integrated into the building structure.

Moreover, TW Utility Model No. M450591 also discloses a flame-retardant device. Referring to FIG. 2, the device mainly includes a pipe casing 20, a thermal-expandable body 21 and a securing member 22. The pipe casing 20 consists of pipe bodies of different radial dimensions so that a sufficient annular space is defined inside the pipe casing 20 to accommodate the thermal-expandable body 21, which will be sealed within the pipe casing 20 by the securing member 22. Similarly, one end of the pipe casing 20 has an annular projecting rim 201 to ensure that the pipe casing 20 is vertically placed at the base of the construction. After being embedded, the pipe casing 20, the thermal-expandable body 21 and the securing member 22 are integrated into the building structure.

Furthermore, TW Patent No. 1357961 discloses a seal with fire protection. FIG. 3 is a section view of the seal with fire protection. The seal is in the form of a tube and mainly includes a front base part 30, a rear base part 31, an intumescent material 32, a front fitting 33 and peelable layers 34. The intumescent material 32 is sandwiched between the front base part 30 and the rear base part 31. One or more of the peelable layers are peeled off according to the size of the pipe to be inserted so as to form a passageway of proper size. The front fitting 33, like the aforementioned annular projecting rim, is a horizontal member configured to facilitate the installation process. After being embedded, the front base part 30, the rear base part 31 and the intumescent material 32 are all integrated into the building structure.

The aforementioned prior art techniques are indeed capable of providing the flame-retardant function. Specifically, when heat is transmitted to these pipe casings, the thermal-expandable foams will react and expend drastically to stop flames and smoke from spreading along the pipes. However, all of the aforementioned designs did not take into consideration the convenience in installing pipe casings and the effectiveness of the thermal-expandable foam.

Regarding the convenience in installation, when a pipe casing with an annular projecting rim is disposed at a steel supporting panel, seams would be formed between the installation hole defined on the steel supporting panel and the pipe due to the size of the annular projecting rim, thus an extra shielding member (such as a mud retaining box) is usually required to prevent the poured concrete from leaking from the seams. This method is time consuming and labor consuming.

Regarding the effectiveness of the thermal-expandable foam, the thermal-expandable foam may be spontaneously aging or subject to environment influence become ineffective or exhibit less satisfactory flame-retardant performance due to deterioration caused by, for example, dampness or temperature change. Therefore, inspection and replacement operations are required to ensure the effectiveness of the thermal-expandable foam. The technical solutions provided by the foregoing patented techniques, however, cannot allow the embedded thermal-expandable foam to be inspected, let alone being removed and replaced. It is difficult to guarantee that the initially embedded thermal-expandable foam will be applicable after long-term installation.

In order to improve the convenience in installing pipes and enable the thermal-expandable foam to be inspected and replaced, the configuration of the pipe casing should be improved.

SUMMARY

An object of the present invention is to provide a pre-embedded/pre-built-in hole creating apparatus having a detachable structure, which is favorable for inspecting and replacing the fireproof material in the hole creating apparatus.

To solve problems caused by the aforementioned prior art techniques, the present invention provides a pre-embedded/pre-built-in hole creating apparatus, including: a pipe casing having two ends defining there between a passage to allow a pipe to be inserted there through; a thermal-expandable foam detachably accommodated within the passage of the pipe casing; an inspection annulus detachably joined with the pipe casing and partially abutting against the thermal-expandable foam so as to retain the thermal-expandable foam in the passage.

With the detachable mechanism of the present invention, an operator can optionally detach the inspection annulus from the pipe casing to remove the thermal-expandable foam inside the apparatus for further inspection or replacement so as to ensure its effectiveness, thereby maintaining the flame-retardant/fire-blocking function of the apparatus. The present invention features convenience and maintainability because the embedded apparatus can be removed without damaging the original building structure.

The foregoing aspects and other aspects of the present invention will be fully described with exemplary embodiments below by reference to the appended drawings.

DETAILED DESCRIPTION

The present invention will be fully described by way of preferred embodiments and appended drawings to facilitate the understanding of the technical features, contents and advantages of the present invention and the effect to be achieved by the present invention. It will be understood that the appended drawings are merely schematic representations and may not be illustrated according to actual scale and precise arrangement of the implemented invention. Therefore, the scope of protection of the present invention shall not be construed based on the scale and arrangement illustrated on the appended drawings and limited thereto. The terms "pipe sleeve" and "sleeve pipe" as used herein both refer to a tubular structure. Unless the context clearly indicates otherwise, a person having ordinary knowledge in the art understands that the forms of the components denoted by the foregoing two terms are identical regardless of the phrasing.

Figure 1:
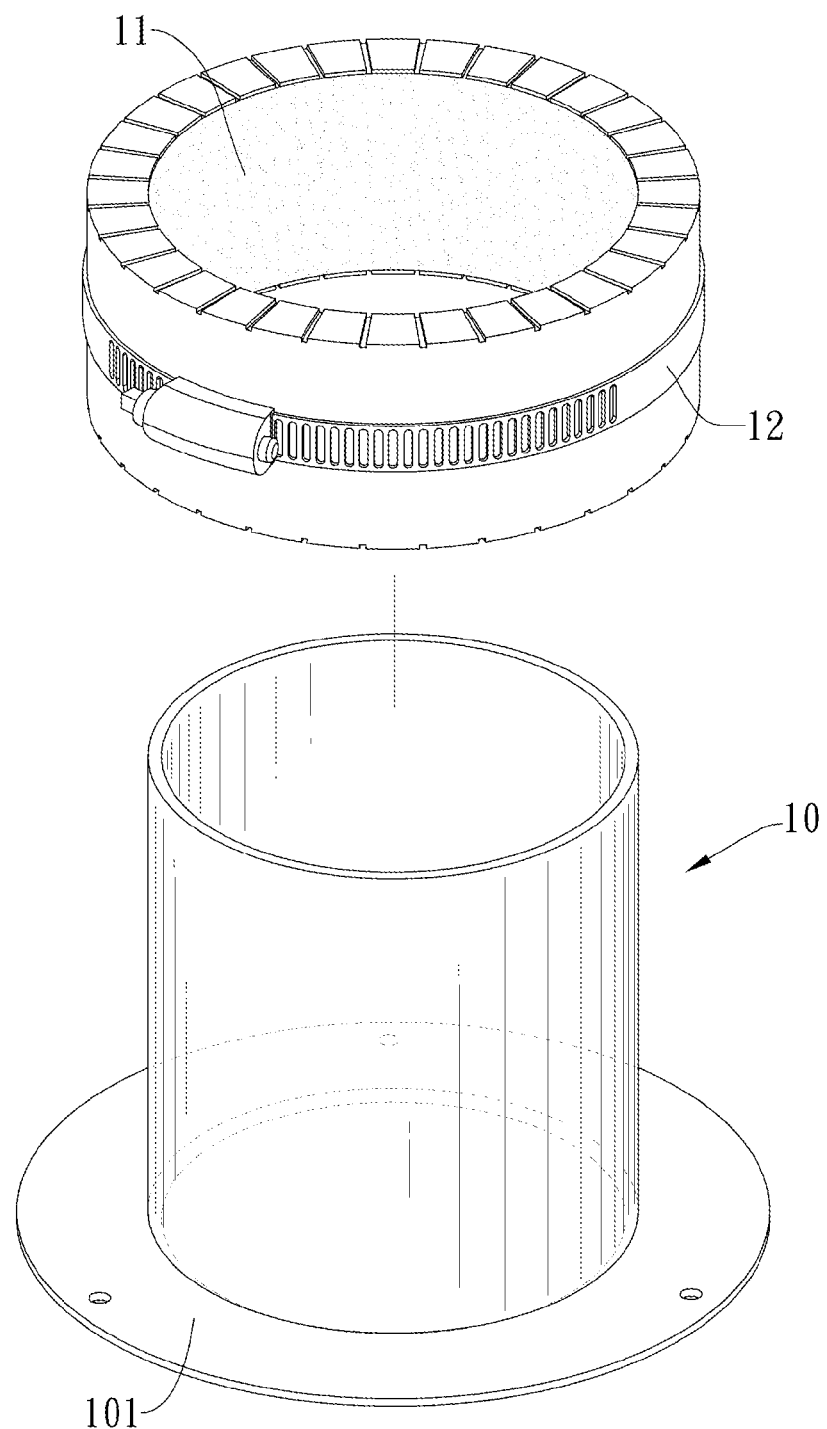
FIGS. 1-3 show the prior art techniques related to the present invention.
Figure 2:
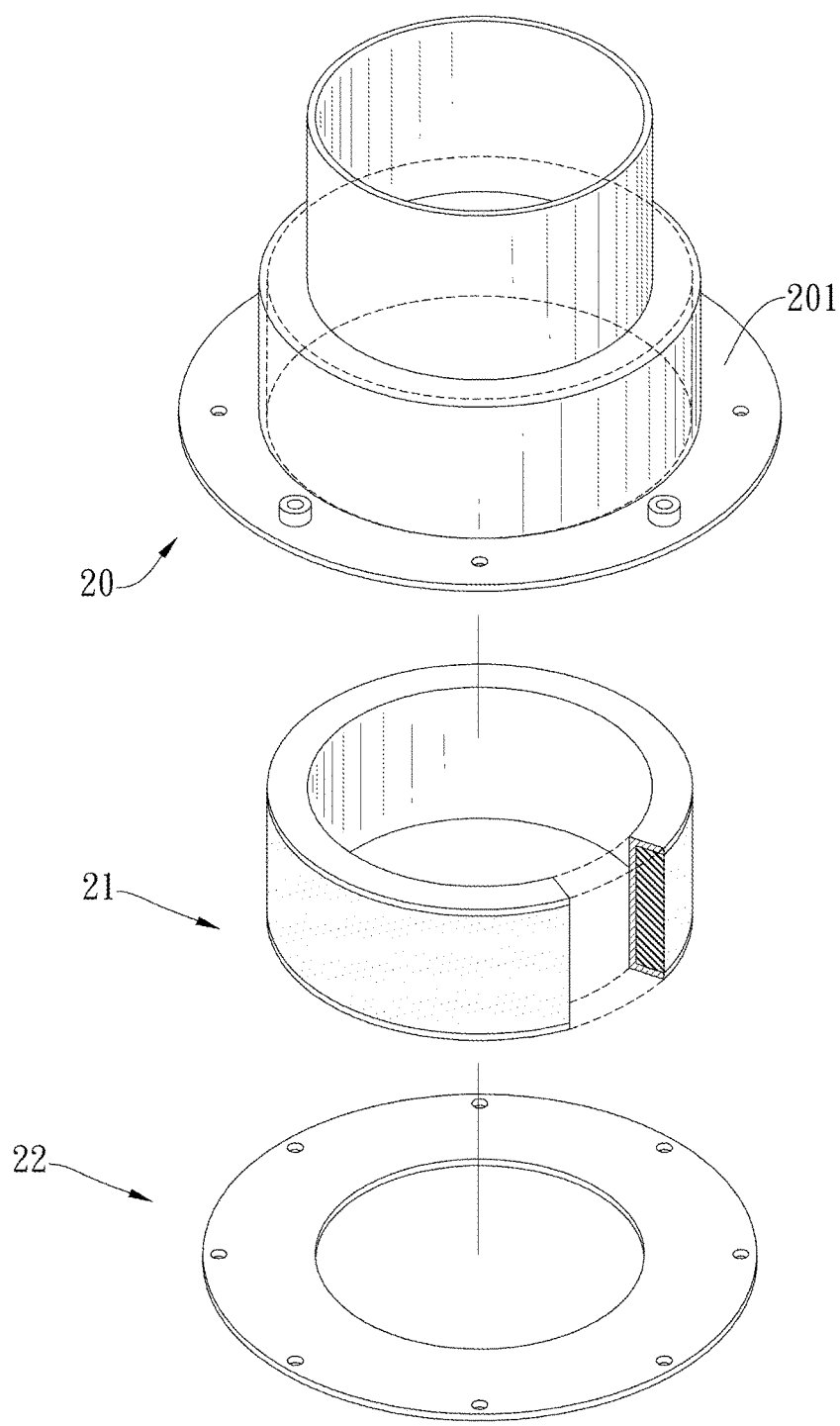
Figure 3:
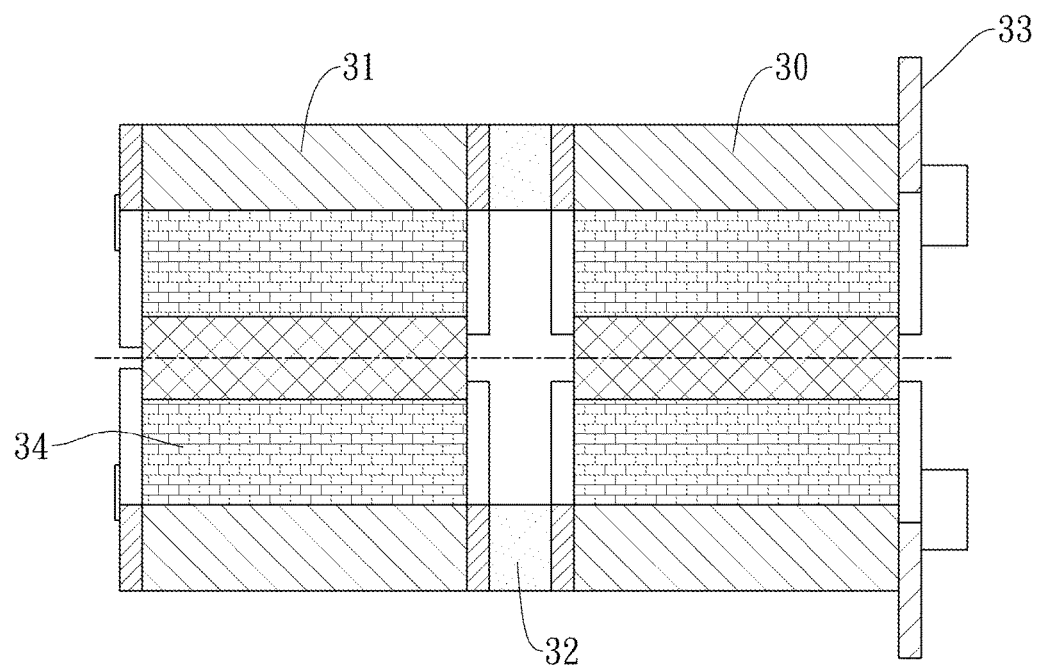
Figure 4A:
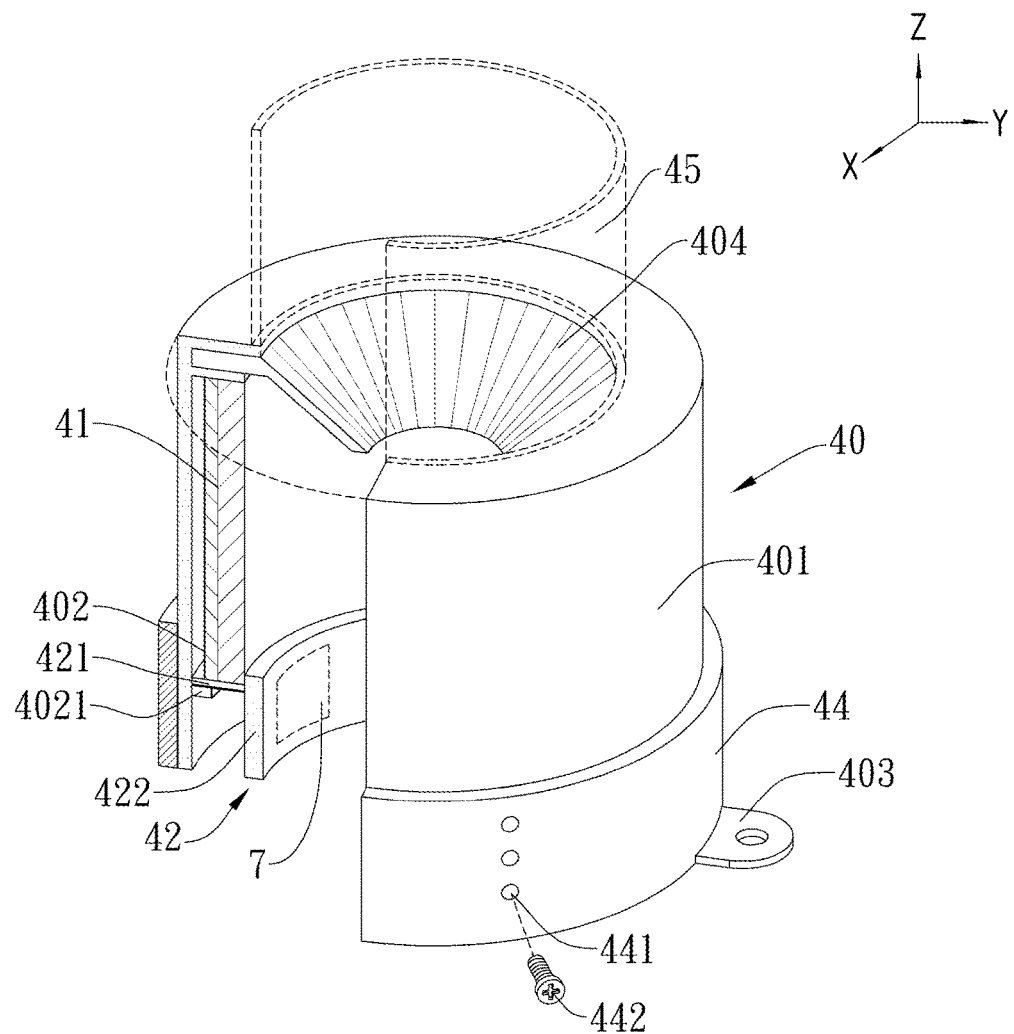
FIG. 4A is a perspective partial sectional view of a pre-embedded/pre-built-in hole creating apparatus in accordance with a preferred embodiment of the present invention.

FIG. 4A is a perspective partial sectional view of a pre-embedded/pre-built-in hole creating apparatus in accordance with a preferred embodiment of the present invention. Referring to FIG. 4, the pre-embedded/pre-built-in hole creating apparatus mainly includes a pipe casing 40, a thermal-expandable foam 41 and an inspection annulus 42. The features of each component will be detailed more fully below.

The pipe casing 40 has an exterior surface 401 and an interior surface 402. The exterior surface 401 of the pipe casing 40 is a substantially uniform cylindrical surface extending along a Z axis. The pipe casing 40 has a height in the Z-axis direction. The height of the pipe casing 40 is adjustable according to the thickness of the floor or wall in which the pipe casing 40 is to be embedded. The interior surface 402 of the pipe casing 40 is a substantially smooth curved surface defining a passage to allow at least one pipe (not shown) to pass through the pipe casing 40 and to connect with an extended sleeve pipe 45. The pipe casing 40 can be made of a metallic material, a plastic material, a fireproof material or some other composite material, and its shape is not limited to the shapes disclosed in the appended drawings.

Figure 8:
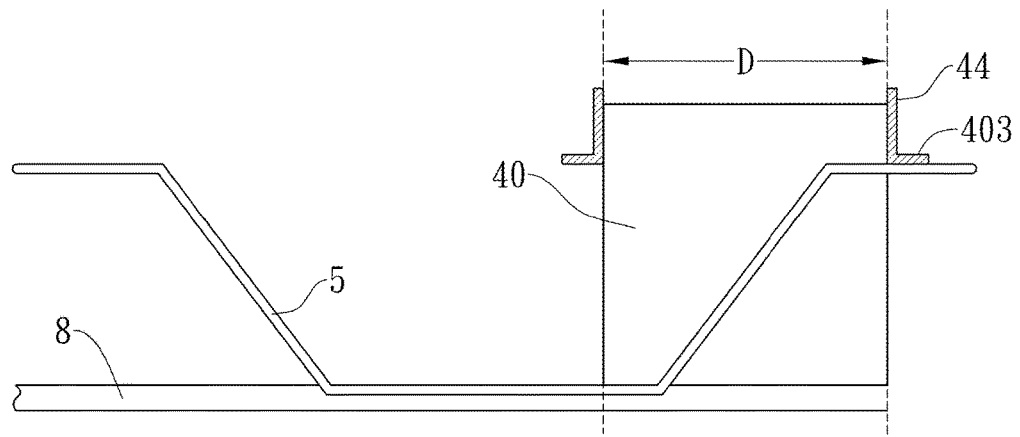
FIG. 8 is a side view showing the joining of a pre-embedded/pre-built-in hole creating apparatus of the present invention, a moldboard and a steel supporting panel.

The pipe casing 40 has two opposite ends in the Z-axis direction, and the passage is defined between the two ends. A slide cover 44 is installed onto the exterior surface 401 of the pipe casing 40 and capable of sliding between the two ends of the pipe casing 40. A securing ear 403 and an annular shielding plate 404 are respectively positioned in proximity to the two ends of the pipe casing 40. The securing ear 403 is formed at one end of the slide cover 44 close to the pipe casing 40 and extends outwardly from the slide cover 44 in a direction perpendicular the Z axis. The securing ear 403 can be arranged at substantially the same level as, or at a different level from, one end of the pipe casing 40. In other embodiments of the present invention, the slide cover 44 can have a plurality of securing ears 403. The securing ear 403 will be further described in detail in connection with a discussion of FIG. 8. There is actually a gap (not shown) between the slide cover 44 and the pipe casing 40. The slide cover 44 defines a plurality of securing holes 441 for bolts 442 to be inserted there through and tightened. The tightened bolts 442 will abut against the exterior surface 401 of the pipe casing 40 so as to secure the slide cover 44. The arrangement of the securing holes 441 and bolts 442 enables the slide cover 44 to be adjusted according to needs (as shown in FIG. 8).

The annular shielding plate 404 is a flexible plate body having a substantially annular shape. The annular shielding plate 404 is positioned in proximity to the other end of the pipe casing 40 with its surface partially attached to the interior surface 402 of the pipe casing 40. In other embodiments of the present invention, the annular shielding plate 404 can be joined with the pipe casing 40 by way of insertion, which is common knowledge for a person having ordinary knowledge in the art and thus no further description will be provided. As shown in FIG. 4, another portion of the annular shielding plate 404 is inclined toward the interior of the pipe casing 40. In other embodiments of the present invention, the annular shielding plate 404 can be inclined toward the exterior (not shown) of the pipe casing 40. The annular shielding plate 404 is configured such that the pipe snugly fits the pipe casing 40 through which it passes, as a result, the minimized gap prevents gases from passing through the pipe casing 40. Such an arrangement can prevent a large amount of smoke generated in a fire accident from spreading uncontrollably. The prior art techniques disclosed in the above-mentioned patents, however, do not produce such an effect.

The thermal-expandable foam 41 can have a substantially annular shape. The thermal-expandable foam 41 has a height in the Z-axis direction. The thermal-expandable foam 41 has an outer surface (not shown) and an inner surface (not shown). The thermal-expandable foam 41 is placed inside the pipe casing 40 with the outer surface thereof corresponding to the interior surface 402 of the pipe casing 40. After a pipe has been inserted into the pipe casing 40, the inner surface of the thermal-expandable foam 41 faces the pipe. The thermal-expandable foam 41 has a height that is less than the height of the pipe casing 40. In other embodiments of the present invention, a plurality of thermal-expandable foams can be arranged inside the pipe casing 40. The thermal-expandable foam 41 can be a block-shaped object formed by vacuum packaging. Alternatively, the thermal-expandable foam 41 can be coated on the interior surface 402 of the pipe casing 40. The coated thermal-expandable foam 41 will expand toward the pipe under high temperature until it fully occupies the space between the pipe and the pipe casing 40.

Figure 5:
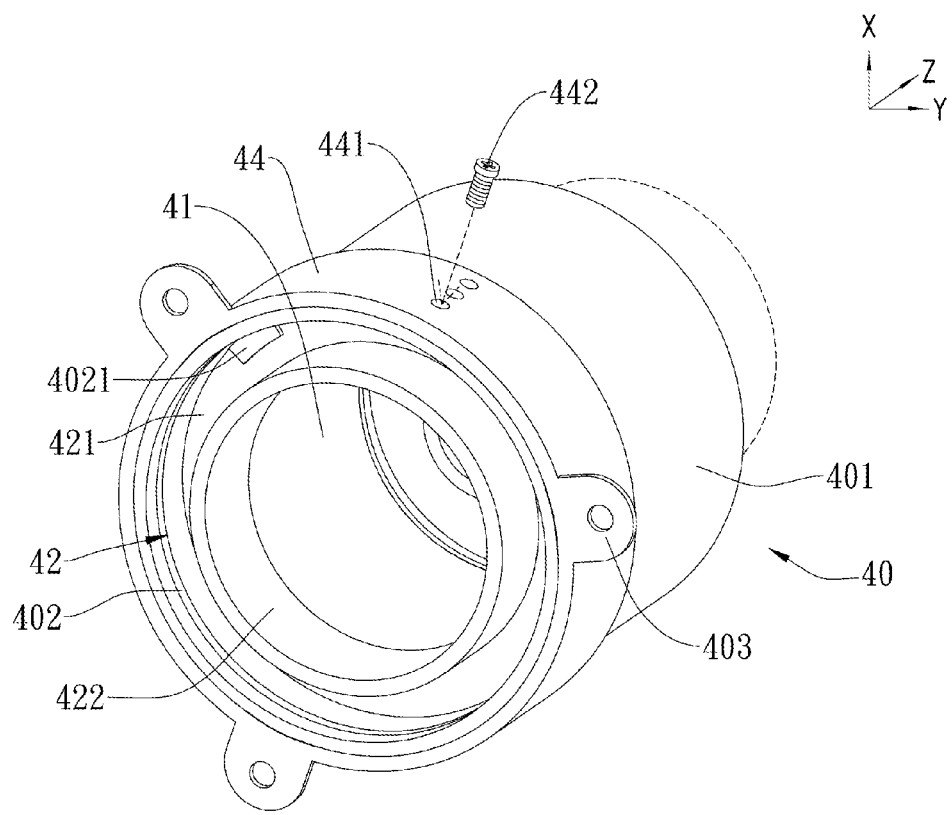
FIG. 5 is a perspective view showing one end of the pre-embedded/pre-built-in hole creating apparatus of the present invention shown in FIG. 4A.
Figure 9:
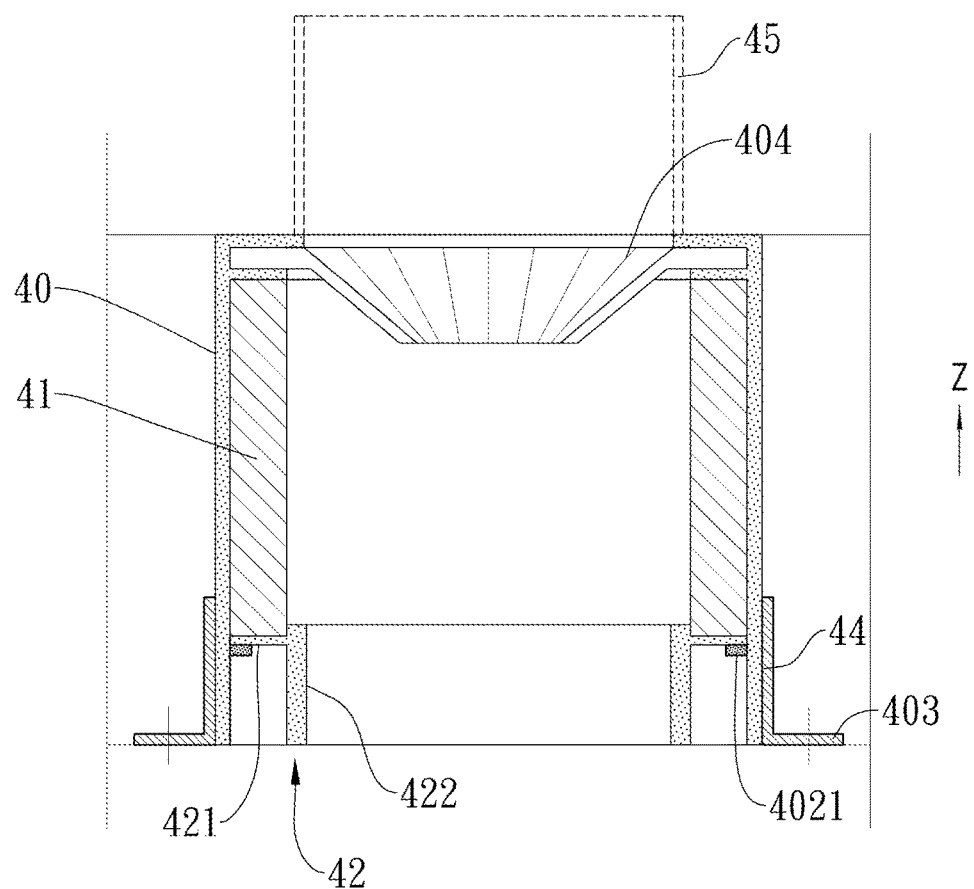
FIG. 9 is a section view of an embedded hole creating apparatus.

Referring to FIGS. 4A and 5, the inspection annulus 42 is detachably joined inside the pipe casing 40 and abuts against one side of the thermal-expandable foam 41. The inspection annulus 42 mainly consists of an abutting portion 421 and an extended portion 422. The abutting portion 421 is a substantially annular body in parallel with an XY plane, and a radial dimension thereof can be substantially the same as or slightly smaller than the internal diameter of the pipe casing 40. The extended portion 422 extends from the abutting portion 421 toward the two ends of the pipe casing 40 to proper distances along the Z axis so that the inspection annulus 42 can hold the thermal-expandable foam 41 inside the pipe casing 40. The extended portion 422 can also extend to the outside of the pipe casing 40. The inspection annulus 42 and the pipe casing 40 can be joined together through their respective contact structures. For example, in FIG. 5, the interior surface 402 of the pipe casing 40 is provided with at least one protruding block 4021 and at least one corresponding notch (not shown) can be defined at an edge of the abutting portion 421 of the inspection annulus 42. Accordingly, when the inspection annulus 42 is placed into the pipe casing 40, the at least one protruding block 4021 can slide over the at least one notch to allow the inspection annulus 42 to pass there through. Next, the inspection annulus 42 is slightly turned so that the at least one protruding block 4021 is not aligned with the at least one notch but in contact with the abutting portion 421 (as shown in FIG. 9), thereby preventing the inspection annulus 42 from separating from the pipe casing 40. In other embodiments of the present invention, a mechanical joining means can be adopted. For example, the inspection annulus 42 can be mounted inside the pipe casing 40 by threading or some other suitable means (not shown) so that a pipe passes through the inspection annulus 42 when being inserted into the pipe casing 40. In other embodiments of the present invention, the inspection annulus 42 can be equipped with an additional structure (not shown) similar to the annular shielding plate 404 so that the two ends of the pipe casing 40 can snugly enclose the inserted pipe and thereby to more effectively prevent smoke from spreading. The use of the inspection annulus 42 will be more fully described below.

Figure 4B:
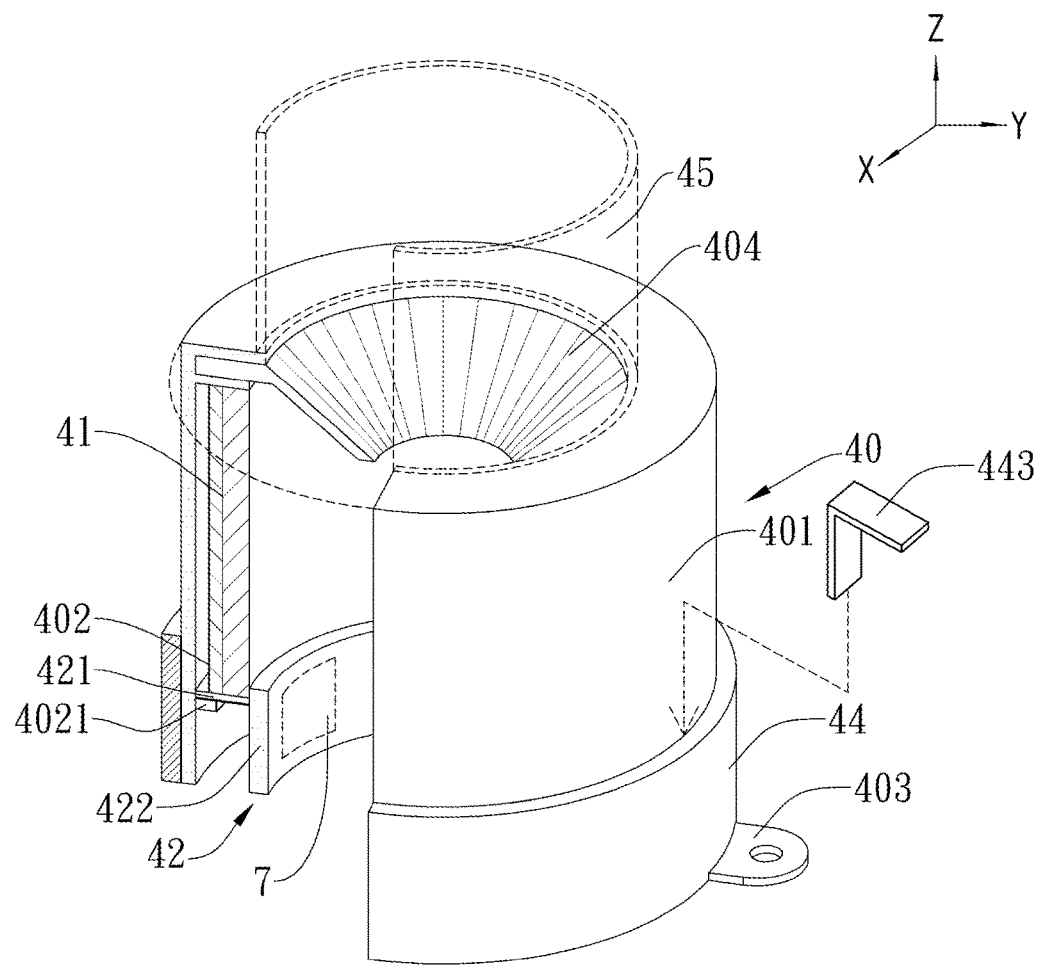
FIG. 4B is a perspective partial sectional view of a pre-embedded/pre-built-in hole creating apparatus in accordance with another preferred embodiment of the present invention.

FIG. 4B illustrates a pre-embedded/pre-built-in hole creating apparatus in accordance with another embodiment of the present invention. Said securing holes 441 and bolts 442 illustrated in FIG. 4A can be replaced with a plug 443 having an end inserted into the space between the slide cover 44 and the exterior surface 401 to secure the slide cover 44 on the exterior surface 401. The plug 443 is substantially formed with an L-shape body. The space defined between the exterior surface 401 and the slide cover 44 is omitted in the drawing for brevity, however, said plug 443 has a thickness substantially corresponding to the space. When the plug 443 is applied with its end inserted into the space between the exterior surface 401 and the slide cover 44, the provided friction in between is able to ensure the secure of the slide cover 44 on the exterior surface 401. That is, when the position of slide cover 44 relative to the exterior surface 401 is determined, the use of the plug 443 allows an easy fixing of the slide cover 44 to the exterior surface 401 and also an easy releasing of the slide cover 44 from the exterior surface 401. Although not presented in the drawing, the slide cover 44 may be shaped and sized, e.g. having different heights defined along the z-axis, depending on the specific application. Generally, the height of the slide cover 44 is less than that of the exterior surface 401 along the z-axis direction.

Figure 6:
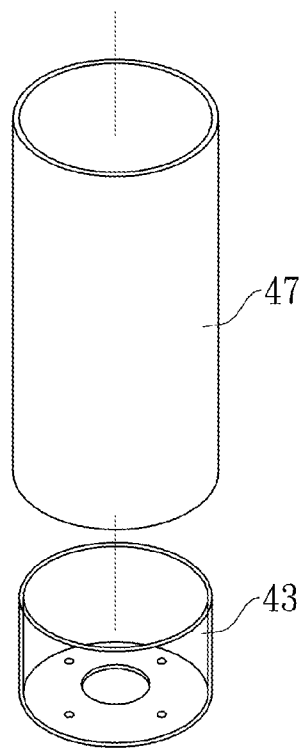
FIG. 6 is an exploded view showing an insertion annulus and a sleeve pipe into which the insertion annulus is to be inserted in accordance with an embodiment of the present invention.
Figure 7:
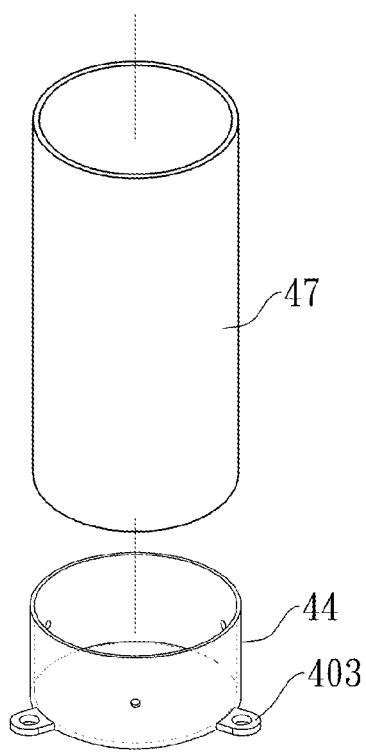
FIG. 7 is an exploded view showing the slide cover of FIG. 4 A and a sleeve pipe onto which the slide cover is to be installed in accordance with an embodiment of the present invention.
Figure 11:
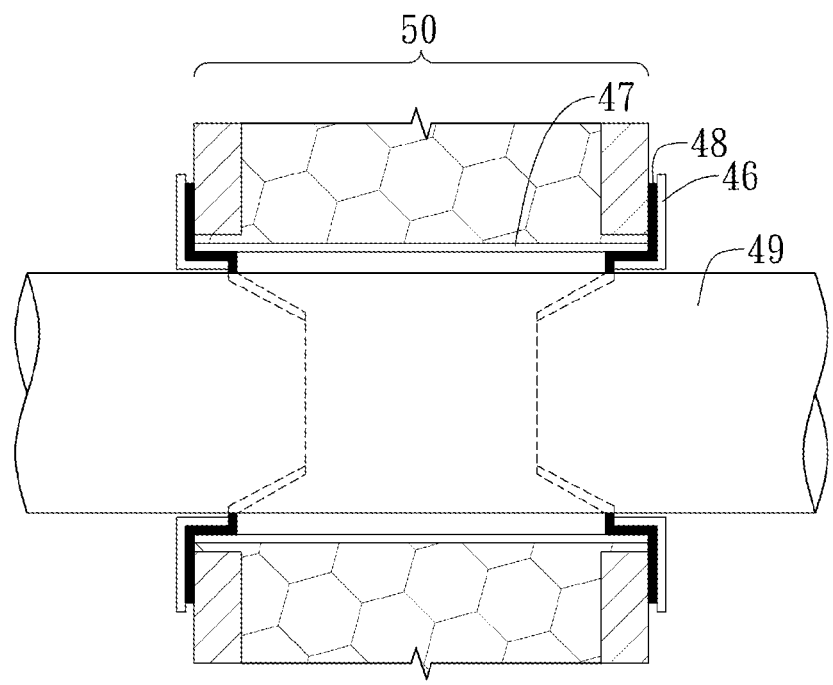
FIGS. 11 and 12 are schematic views showing the application of a pre-embedded/pre-built-in hole creating apparatus of the present invention to a light partition.

FIG. 6 is an exploded view of an embodiment of the present invention showing an insertion annulus 43 and a sleeve pipe 47 into which the insertion annulus is to be inserted in accordance. In this embodiment, the insertion annulus 43 can be a substantially annular container whose bottom surface has a hole for a pipe to be inserted there through after the removal of the mold. Similarly, the insertion annulus 43 detachably joined inside a sleeve pipe of a proper size, such as the sleeve pipe 47 of the present invention. The insertion annulus 43 can also accommodate a thermal-expandable foam (not shown) and thereby to put the thermal-expandable foam inside the sleeve pipe 47. FIG. 7 is an exploded view showing the slide cover 44 of FIG. 4A and the sleeve pipe 47 onto which the slide cover 44 is to be installed. The sleeve pipe 47 is different from the pipe casing 40. The sleeve pipe 47 can be an outer pipe or an inner pipe in a multi-layered pipeline as shown in FIG. 11.

Referring to FIG. 4A, in some embodiments of the present invention, the pre-embedded/pre-built-in hole creating apparatus can further include an identifying device 7 attached thereto at a proper location and communicatingly coupled with a remote management system (not shown) so as to provide product information of the pre-embedded/pre-built-in hole creating apparatus. For example, the identifying device 7 can be an radio frequency identification (RFID) device mainly consisting of a chip with reading and writing functions and an antenna, such as an RFID tag. The device 7 can be attached to the interior of the pre-embedded/pre-built-in hole creating apparatus, such as a surface of the inspection annulus 42. The RFID device can carry product information of the pre-embedded/pre-built-in hole creating apparatus, including information about the serial number and size of the pre-embedded/pre-built-in hole creating apparatus, the corresponding pipe or the expiration date of the material used to make the thermal-expandable foam 41 accommodated therein. Accordingly, relevant information of the pre-embedded/pre-built-in hole creating apparatus is accessible through an access device (not shown) of the remote management system in communication with the identifying device 7 so as to effectively manage the pre-embedded/pre-built-in hole creating apparatus and the pipe therein in a building. The combination of the pre-embedded/pre-built-in hole creating apparatus, the indentifying device 7 and the remote access technology can constitute a pre-embedded/pre-built-in hole creating system.

In another feasible embodiment of the present invention, the identifying device 7 is a barcode label carrying the above-mentioned product information corresponding to the pre-embedded/pre-built-in hole creating apparatus (the barcode is relevant to the access of product information) so that an operator can perform inspection and maintenance of the pre-embedded/pre-built-in hole creating apparatus with a barcode reader and determine whether or not the flame-retardant material (i.e. the thermal-expandable foam) should be replaced based on the acquired information.

During the process of constructing a building, in order to create a reserved pipe hole on a floor or a wall, the pre-embedded/pre-built-in hole creating apparatus of the present invention should be secured to a base structure to determine the location of the reserved hole. For example, a steel supporting panel 5 and a moldboard 8 shown in FIG. 8 are common base structures used to construct a floor. FIG. 8 is a side view showing the joining of a pre-embedded/pre-built-in hole creating apparatus of the present invention, the moldboard 8 and the steel supporting panel 5. An installation hole should be defined on the steel supporting panel 5 prior to the installation. The installation hole has a radial dimension D substantially the same as that of the pipe casing 40 of the pre-embedded/pre-built-in hole creating apparatus so as to receive the pre-embedded/pre-built-in hole creating apparatus. The slide cover 44 is installed onto the pipe casing 40 and secured thereto by welding. The slide cover 44 can be adjusted to a suitable position according to the height of the steel supporting panel 5 so that the pipe casing 40 and the slide cover 44 can be in multipoint contact with/welded to the steel supporting panel 5. The securing ear 403 on the slide cover 44 or the slide cover 44 per se can rest on a horizontal surface of the steel supporting panel 5 to ensure that the pipe casing 40 is placed vertically on the steel supporting panel 5. The securing ear 403 or the slide cover 44 can be secured to the supporting panel by welding, or secured to the moldboard 8 via bolts. It is to be noted that the conventional annular projecting rim is simplified to a securing ear 403 in the pre-embedded/pre-built-in hole creating apparatus of the present invention. If an annular projecting rim is adopted, the installation hole's size must be greater than the pipe casing's. Therefore, the reason the present invention employs the securing ear 403 is because only the pipe casing's size needs to be taken into consideration in configuring the radial dimension D of the installation hole to allow the pre-embedded/pre-built-in hole creating apparatus of the present invention to be directly received in the installation hole without creating any gaps there between. In other words, since no gaps exist, no additional shelter (e.g. a mud retaining box) is required to prevent concrete poured onto the steel supporting panel from leaking from gaps. The present invention significantly improves the convenience in installation.

The embedded hole creating apparatus forms a reserved hole on the floor or wall so that a pipe can be inserted there through. Preferably, the pipe has a size that enables it to snugly fit the annular shielding plate 404. Referring to FIG. 9, after the pre-embedded/pre-built-in hole creating apparatus has been embedded, the thermal-expandable foam 41 is concealed in the building structure as well. As the inspection annulus 42 is not embedded, it can be detached from the pipe casing 40 by slightly turning it along the Z axis, thereby removing the thermal-expandable foam 41 placed inside the pipe casing 40. By contrast, the thermal-expandable foams embedded using the prior art techniques could not be removed for inspection, thus there is no way to ascertain the effectiveness of the material. The pre-embedded/pre-built-in hole creating apparatus of the present invention has a detachable structure, thus the embedded thermal-expandable foam can be removed for inspection and replaced without damaging the surrounding structure. The present invention is distinct from the prior art techniques in terms of the feasibility of inspecting and replacing the thermal-expandable foam.

Figure 10:
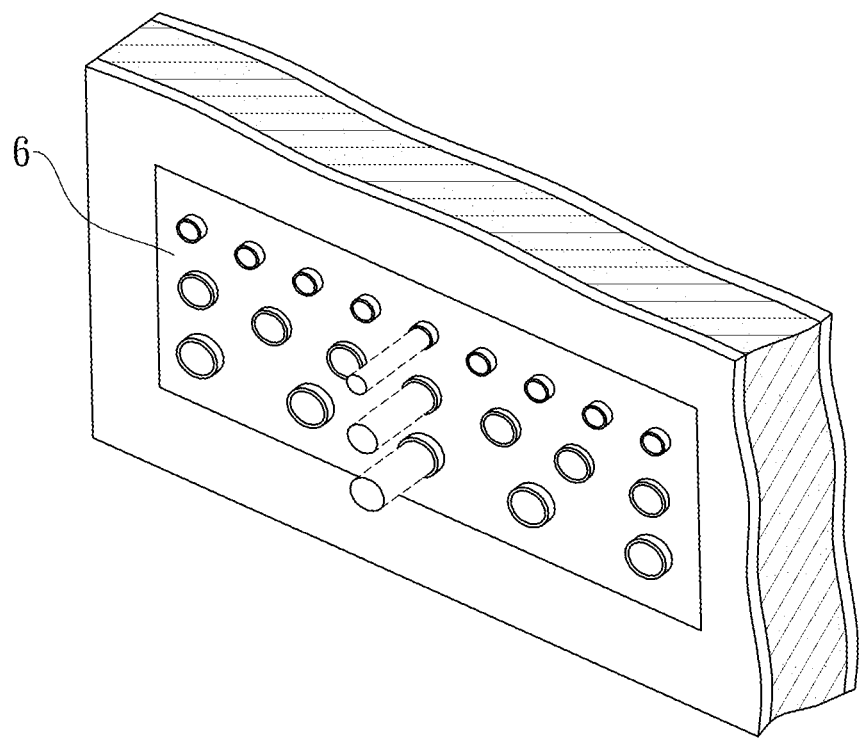
FIG. 10 is a schematic view showing the application of a pre-embedded/pre-built-in hole creating apparatus of the present invention to a pipe bank box.

Referring to FIG. 10, the pre-embedded/pre-built-in hole creating apparatus of the present invention and a pipe bank box 6 can be conjugated and then inlaid into the wall (or floor). A plurality of pre-embedded/pre-built-in hole creating apparatuses of the present invention, which may have various sizes for different types of pipes to be inserted there through, are inlaid into one surface of the pipe bank box 6 (the opposite surface is not shown). The pipe bank box 6 has a chamber in which the plurality of pre-embedded/pre-built-in hole creating apparatuses are partially accommodated while the remaining space can be filled with fireproof material to improve the flame-retardant performance of the area where the pipe bank box 6 is inlaid. Alternatively, the pipe bank box 6 is completely embedded in the concrete structure with only the plurality of pre-embedded/pre-built-in hole creating apparatuses partially exposed. If the exposed ends of the plurality of pre-embedded/pre-built-in hole creating apparatuses are provided with inspection annuluses, it will be convenient for an operator to remove the thermal-expandable foam in each of the plurality of pre-embedded/pre-built-in hole creating apparatuses for inspection and replacement.

Figure 12:
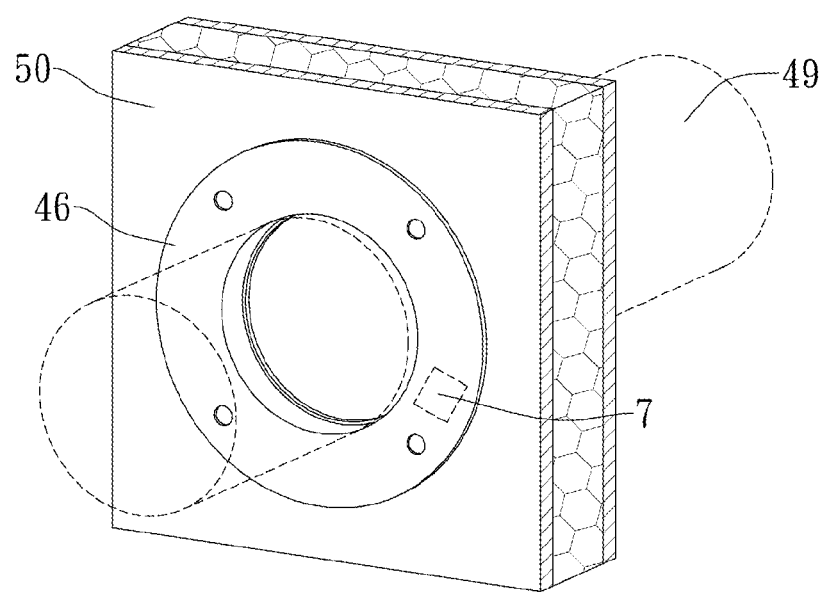

FIGS. 11 and 12 show a building partition wall, such as a light partition wall 50, through which the aforementioned pre-embedded/pre-built-in hole creating apparatus (FIG. 11 merely illustrates a sleeve pipe 47) is inserted. One side of the light partition wall 50 is provided with a securing annulus 46 having a projecting rim. The securing annulus 46 can be secured to one surface of the light partition wall 50 via screws with the projecting rim thereof extending into the sleeve pipe 47 to prevent the sleeve pipe 47 from separating from one surface of the light partition wall 50. A flame-retardant plate 48 whose structure is similar to the structure of the annular shielding plate 404 can be disposed between the securing annulus 46 and the sleeve pipe 47. The flame-retardant plate 48 can be made of a flameproof material. When a penetrating member 49 inserted into the sleeve pipe 47 catches fire, the flame-retardant plate 48 placed inside the sleeve pipe 47 can block fire. The arrangement of the flame-retardant plate 48 can effectively block flames and smoke. The RFID device 7 can also be disposed on the securing annulus 46 to provide access.

Compared with the prior art techniques, the pre-embedded/pre-built-in hole creating apparatus of the present invention has a detachable structure so that the flame-retardant material placed therein can be inspected and replaced to ensure a satisfactory flame-retardant effect for each pipeline system. Moreover, the pre-embedded/pre-built-in hole creating apparatus of the present invention adopts a securing ear rather than a conventional annular projecting rim so that the installation process is simpler. Furthermore, the pre-embedded/pre-built-in hole creating apparatus of the present invention is provided with an annular shielding plate to prevent smoke from passing through the pipe casing and spreading from one room to another in the event of a fire. In general, said annular shielding plate can provide a certain airtight ability for the apparatus. Therefore, the pre-embedded/pre-built-in hole creating apparatus of the present invention exhibits a distinct improvement in maintenance of satisfactory flame and smoke retardant performance and convenience of installation.

The preferred embodiments of the pre-embedded/pre-built-in hole creating apparatus of the present invention have been described by reference to the appended drawings. All the features disclosed herein can be combined with other methods, and every feature disclosed herein can be optionally replaced with a feature with the same, equivalent or similar effect. Therefore, except for particularly distinct features, any feature disclosed herein is an example of identical or similar features. With the preferred embodiments described above, a person skilled in the art understands that the present invention possesses novelty, inventive step and practical applicability. Any modification to the present invention (e.g. a modification to the securing method or securing location) without departing from the scope of the claims can be made by a person skilled in the art.

What is claimed is:

1. A building partition wall through which a pre-built-in hole creating apparatus is inserted, said pre-built-in hole creating apparatus comprising: a pipe casing having two ends and a passage defining therebetween for at least one pipe to pass therethrough, at least one thermal-expandable foam formed into a hollow cylindrical shape and detachably accommodated within the passage of the pipe casing; an inspection annulus detachably coupled to one end of the pipe casing and partially abutting against the at least one thermal-expandable foam to retain the at least one thermal-expandable foam in the passage; and a slide cover installed onto an outer circumference of the pipe casing and capable of sliding between the two ends of the pipe casing, the slide cover being adapted for mounting onto a deck board for constructing a floor of the building; wherein the at least one thermal-expandable foam can be optionally removed from the passage of the pipe casing by optionally detaching the inspection annulus from the pipe casing, wherein the position of the slide cover relative to the pipe casing is selectively adjusted; wherein the slide cover is secured to the pipe casing with a plug, the building partition wall comprising:
a securing annulus having a projecting rim, the securing annulus being secured to one surface of the building partition wall,
a sleeve pipe configured to receive the projecting rim such that the sleeve pipe is prevented from separating from one surface of the building partition wall; and
a flame-retardant plate having an annular shape and disposed between the securing annulus and the sleeve pipe,
wherein the sleeve pipe is nested with said slide cover such that the slide cover of the pre-built-in hole creating apparatus is installed onto the sleeve pipe, thereby said pre-built-in hole creating apparatus being inserted through the building partition wall.

2. A building partition wall through which a pre-built-in hole creating apparatus is inserted, said pre-built-in hole creating apparatus comprising: a pipe casing having two ends and a passage defining therebetween for at least one pipe to pass therethrough; at least one thermal-expandable foam formed into a hollow cylindrical shape and detachably accommodated within the passage of the pipe casing; an inspection annulus detachably coupled to one end of the pipe casing and partially abutting against the at least one thermal-expandable foam to retain the at least one thermal-expandable foam in the passage; and a slide cover installed onto an outer circumference of the pipe casing and capable of sliding between the two ends of the pipe casing, the slide cover being adapted for mounting onto a deck board for constructing a floor of the building; wherein the at least one thermal-expandable foam can be optionally removed from the passage of the pipe casing by optionally detaching the inspection annulus from the pipe casing; wherein the position of the slide cover relative to the pipe casing is selectively adjusted; wherein the slide cover is secured to the pipe casing with threading means, the building partition wall comprising:
a securing annulus having a projecting rim, the securing annulus being secured to one surface of the building partition wall;
a sleeve pipe configured to receive the projecting rim such that the sleeve pipe is prevented from separating from one surface of the building partition wall; and
a flame-retardant plate having an annular shape and disposed between the securing annulus and the sleeve pipe
wherein the sleeve pipe is nested with said slide cover such that the slide cover of the pre-built-in hole creating apparatus is installed onto the sleeve pipe, thereby said pre-built-in hole creating apparatus being inserted through the building partition wall.

* * * * *